United States Patent [19]

Hase

[11] 4,104,539
[45] Aug. 1, 1978

[54] PARALLEL REDUNDANT AND LOAD SHARING REGULATED AC SYSTEM

[76] Inventor: Alfred Max Hase, 6 Manorwood Rd., Scarborough, Ontario, Canada

[21] Appl. No.: 673,820

[22] Filed: Apr. 5, 1976

[51] Int. Cl.² .............................................. H02J 7/00
[52] U.S. Cl. ...................................... 307/64; 307/66; 307/85
[58] Field of Search .................... 307/43, 44, 60–66, 307/80, 85, 326, 327, 328

[56] References Cited

U.S. PATENT DOCUMENTS

| 3,351,770 | 11/1967 | O'Sullivan et al. | 307/64 |
| 3,745,365 | 7/1973 | Spreadbury et al. | 307/64 |
| 3,893,009 | 7/1975 | Watson | 317/39 |
| 3,971,957 | 7/1976 | Hase | 307/64 |

Primary Examiner—Robert K. Schaefer
Assistant Examiner—Michael K. Mutter
Attorney, Agent, or Firm—Donald E. Hewson

[57] ABSTRACT

An electrical power system is provided having two power sources, one being a commercial power source and the other being an inverter. Both power sources are connected to the load so as to share the load, approximately equally. A voltage regulator is in series with the commercial power source, and the inverter is synchronized to the commercial power source. Means are provided for failure sensing and isolation of the inverter; and means are associated with the voltage regulator which is connected in series with the commercial power source to block and sense reverse power flow in a direction from the load towards the first power source and to initiate isolation of the first power source from the load when reverse power flow is sensed. Means may also be provided for sensing line quality parameters, particularly voltage, current and frequency of the commercial power source and for isolating it if any such sensed quality is outside of predetermined limits, so that the regulated inverter would be required to assume the load. On the other hand, if the inverter fails the commercial power line assumes the whole load, of which it already has approximately half, so that the system becomes line redundant. The invention may also be applicable to parallel operated line-regulated AC lines each deriving power from independent commercial AC sources.

11 Claims, 2 Drawing Figures

PARALLEL REDUNDANT AND LOAD SHARING REGULATED AC SYSTEM

FIELD OF THE INVENTION

This invention relates to a control circuit for a parallel redundant and load sharing regulated AC system, whereby two power sources are operated in synchronism and in parallel, each supplying power to an AC load. More particularly, this invention relates to such a system whereby a conditioned or regulated commercial power source is operated in parallel with an inverter, and whereby any failure of the commercial power source or any conditioning or regulating element in series with it which would result in reverse power flow in a direction from the load towards the commercial power source is blocked and isolation of the commercial power source is initiated.

BACKGROUND OF THE INVENTION

In an earlier filed, co-pending application, U.S. application Ser. No. 582,200 filed May 30, 1975, in the name of the applicant herein, there is described an electrical load transfer control system whereby two power sources, one of which may be an inverter and the other of which may be a commercial power source, are arranged so that under normal operating conditions the electrical energy required by the load is provided to it from the inverter and the commercial power source is used as a standby in the event of failure of the inverter. In such a system, a ferroresonant circuit is in series with the inverter, and has a storage element with enough energy storage capacity so as to carry the load for a short period of time; that period of time being sufficient to enable a fast operating switch to close to connect the commercial power source to the line and then a slower operating switch may open so as to disconnect the already failed inverter from the load. However, such a system may, unless proper switches are provided having power isolation, preclude isolation of the otherwise disconnected commercial power line from the load, so that in certain circumstances where the commercial power line may not be operating, power may be fed back to the commercial power line unless, as stated in the aforementioned co-pending application, proper switching arrangements are provided so as to assure complete power isolation of the commercial power line.

The ferroresonant voltage regulating circuit having an energy storage element which is provided in the inverter — and, as will be discussed hereafter with respect to the present invention, also in series with the commercial power source — is advantageously one such as that taught in applicant's U.S. Pat. No. 3,824,449 issued July 16, 1974.

It is occasionally a requisite of AC power systems to provide such a system whereby transfer switching systems may not be desired but where inherent fail-safe, regulated uninterrupted no-break power may be supplied to a critical load, regardless of failure either of a commercial power source or of an inverter of an uninterrupted power supply (UPS) system. This may be especially true if the load is one which is not always constant, because a parallel operated system having a conditioned or regulated AC line in parallel with an inverter, each supplying approximately one half of the total load power, is such that it can supply four times the in-rush current of a single non-redundant inverter supplying the same load.

It is also possible that requirements may arise for a higher regulated load current to be delivered to a load than may be available from one commercial source, but at the same time a second commercial source of a different voltage — or indeed, frequency — may be available whereby the load power requirements might be shared between the two commercial sources. In that case, for purposes of stability and assurance of UPS system operation, float chargers and standby batteries may be provided together with an inverter on one of the lines, with the output of the inverter being synchronized to the other commercial line with which it would then be operated in parallel, in accordance with the principles of this invention.

Thus, this invention provides a line redundant power system having an inverter in synchronism with and in parallel with a commercial power source, each sharing a load, and having means to assure isolation of the commercial power line in the event of failure thereof so as to preclude negative power flow from the inverter to the commercial power line.

It is important to note that failure of a normal operating inverter having sufficient standby battery energy and float charging circuits therefor — so as to assure operation of the inverter in the event of failure of the commercial line supplying the normal operating power for the converter which is rectified and also used to maintain the charge level of the batteries — is statistically much less likely to happen than failure of the commercial power source or operation of that power source outside of predetermined limits, may happen. Thus, in a power system which is line redundant — having the commercial power line operated in parallel and load sharing relationship with an inverter — it is important to provide means to isolate the commercial power line in the event of its failure. Inverters would, in any event, carry normal isolating circuitry; and the inverters may be of the sort taught in applicant's U.S. Pat. No. 3,931,565 issued Jan. 6, 1976.

It has often been the case, in the past, where an AC power system was provided having a DC driven standby power supply. Such a system is taught in O'Sullivan U.S. Pat. No. 3,351,770, issued Nov. 7, 1967. That patent, however, teaches a standby system whereby a normal AC line is operated in parallel with an inverter, but that the AC input provided by the normal power line is at a somewhat higher voltage than the inverter output so that most of the power supply to the load is from the AC line. In the event that the AC line fails, either short or open, or drops slowly, the inverter is arranged to deliver the necessary proportion of the power to maintain the load, and in addition the power required by the total impedance of the AC line. This results, however, in a totally unsafe system and one which would be completely unacceptable to utilities and hydro power authorities and commissions in most jurisdictions, because the system permits for energy interchange between the line and the inverter passed the load, depending on the line and load conditions. In particular, the O'Sullivan patent provides for energy interchange from the inverter to the commercial AC line, an unacceptable circumstance.

Thus, the present invention provides a system where normally the inverter and the commercial power line — which has a conditioned, regulated output — share the load approximately equally; but where, in the event of inverter system failure, the conditioned and regulated commercial power line supplies the full load, and in the event of failure of the commercial power source, the UPS system inverter supplies the full load. The present invention provides a parallel redundant the load sharing regulated AC system whereby any reverse power flow in a direction from the load towards the commercial power source is blocked, sensed and isolation of the commercial power source is initiated.

Because the operating systems — the commercial power source and the UPS inverter — are sharing the load, and because each has an energy storage element included in it as part of the voltage regulation — the ferroresonant circuit which is normally used being, in any event, downstream towards the load from the commercial power source or the inverter, respectively — there is no undue power loss or interruption of power being fed to the load in the event of failure of either side.

It is important to note that the present invention may also relate to parallel line-regulated systems where two conditioned and regulated commercial AC sources which are operated in synchronism but which are otherwise independent one of the other are operated in parallel. In such circumstances, of course, appropriate logic circuits are required for sensing the synchronism between the two independent commercial AC sources, as well as for other supervisory and sensing purposes.

BRIEF SUMMARY OF THE INVENTION

It is an object of this invention to provide a parallel redundant and load sharing regulated AC system whereby failure of either side of the power supply to the load will result in the other side taking up the full load share, and at the same time assurance is given whereby failure of one side of the system will not result in reverse power flow from the other side of the system towards the failed side.

It is another object of this invention to provide a parallel redundant and load sharing regulated AC system whereby failure of either side of the power supply to the load will result in the other side taking up the full load share, and at the same time assurance is given whereby failure of the commercial power side will not result in reverse power flow from the inverter towards the failed commercial power source.

A further object of this invention is to provide a parallel redundant and load sharing AC system having a regulated commercial AC line and an inverter operating in synchronism and in parallel, whereby isolation of the commercial power source from the load may be initiated either upon sensing reverse power flow, or upon sensing the existence of a parameter outside of predetermined limits; and where, in any event, reverse power flow towards the commercial power source is blocked at the instant that it tends to start.

Yet another feature of this invention is that a parallel redundant and load sharing AC system in accordance herewith may be provided using components and elements which are substantially "off-the-shelf" items, having regard to the nature of the usual supply of such high tolerance, high power capacity and costly items.

BRIEF DESCRIPTION OF THE DRAWINGS

These and other features and objects of this invention will become more evident hereafter in the following discussion, taken in association with the accompanying drawings, in which.

DESCRIPTION OF THE PREFERRED EMBODIMENTS

As noted above, it is the principal purpose of this invention to provide a parallel redundant and load sharing AC system having a commercial power source which is conditioned and regulated and an inverter, operating in parallel, and sharing in approximately equal portions, an AC load — usually a critical load of the sort which demands an uninterrupted and regulated AC supply. Such loads may, of course, be of the sort including relay stations used in telecommunications, computers, process control or data control apparatus, and the like. Very often, such critical AC loads require that the AC power delivered to them be regulated to within plus or minus 1%, and have low harmonic distortion — usually less than 5% second and third harmonics.

Figure 1:
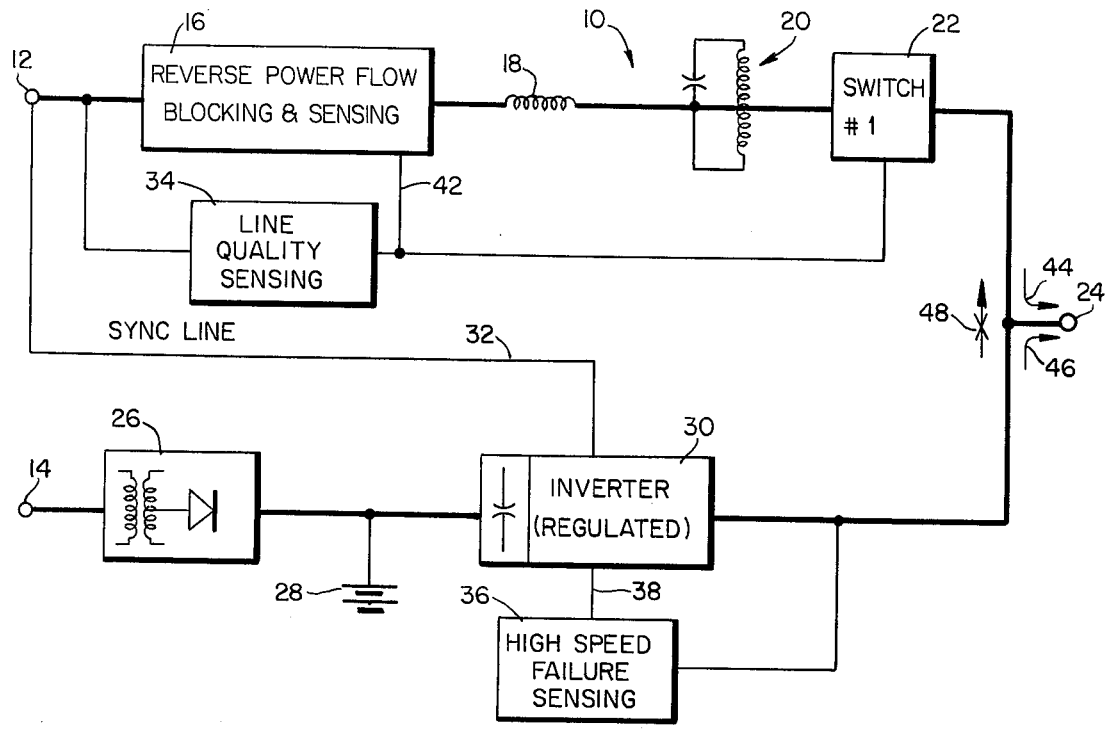
FIG. 1 is a simplified circuit showing the basic elements of a parallel redundant and load sharing AC system according to this invention.

In FIG. 1, there is shown a parallel redundant and load sharing regulated AC system 10, having a first commercial power source 12 and a second commercial power source 14. As mentioned previously, the commercial power sources 12 and 14 are usually identical, but they may not necessarily be identical, and may be at different voltages and indeed from different suppliers. In any event, there is connected in series with the commercial power source 12 a reverse power flow blocking and sensing circuit 16, a linear reactor 18, a voltage regulator 20 which is preferably a ferroresonant voltage regulator and is shown as such, and a switch means 22. The downstream side of the switch 22 is connected to a load terminal 24.

In series with the commercial power source 14, there is a float charger and rectifier shown generally at 26, whose output is fed to a battery 28 which is connected to the line in the usual manner, and to a regulated inverter 30. The output of the inverter 30 is also connected to the load terminal 24; and the inverter 30 is connected to the commercial power source 12 by synchronization line 32. [The means whereby synchronism of the inverter 30 to the commercial power source 12 may be such as are particularly shown in applicant's co-pending application Ser. No. 219,624 filed Feb. 7, 1975.]

A line quality sensing circuit 34 is connected to the commercial power source 12, to the reverse power flow blocking and sensing circuits 16, and to the switch 22.

In general, the operation of the circuit of FIG. 1 is such that during normal operation the load demand on the circuit is approximately equally shared by both power sources, namely the regulated AC power output from voltage regulator 20 and the UPS inverter 30 which is synchronized to the commercial power source 12. In general, the inverter 30 has failure sensing means 36 associated with it, so that in the rare event of failure of the inverter, it may be isolated from the load terminal 24 such as by operation of internal inverter isolating circuit elements under the control of signals on line 38. In contradistinction thereto, failure of the commercial power source 14 would not result in failure of the inverter 30, because the commercial power source 14 would be isolated from the inverter 30 which would then derive its input DC energy from battery 28, so as to assure uninterrupted power supply.

However, the commercial power source 12 is more likely to fail than the inverter 30, and while it normally operates and provides regulated AC power to the load terminal 24 from the output of the ferroresonant voltage regulator 20, the commercial power source 12 may fail. As soon as any such failure occurs, reverse power flow in the direction towards the commercial power source 12 from the inverter 30 or the load terminal 24 might tend to occur, but the reverse power flow blocking and sensing circuits 16 will preclude such reverse power flow. A static switch may be included in the reverse power flow blocking and sensing circuits 16 for that purpose. In any event, as soon as the reverse power flow is sensed or the tendency of such reverse power flow is sensed, isolation of the commercial power source 12 from the load terminal 24 — and, indeed, from the inverter 30 — is initiated by opening switch 22 under control of a signal on line 40 and 42 from the reverse power flow blocking and sensing circuits 16. Thus, under normal operation, power is supplied to the load terminal 24 as indicated at arrows 44 and 46; but in the event of failure of the commercial power source 12, or any component or element in the line in series with the commercial power source 12 and downstream therefrom towards the load terminal 24, will result in isolation of the commercial power source 12 so as to preclude energy flow passed and load terminal 24 in a direction towards the commercial power source 12 such as indicated by arrow 48.

The failure of the commercial power source 12 may be such that the line may fail completely, or certain line quality parameters such as voltage, current supplied and frequency of the commercial power source may begin to fail and thereby go beyond certain predetermined limits. Those parameters are sensed by the line quality sensing circuits 34, and failure of any of the sensed parameters or the excursion by such a parameter outside of predetermined limits would initiate an opening operation of the switch 22 and thereby isolation of the commercial power source 12 under control of a signal on line 40 from the line quality sensing circuits 34.

Thus, any reverse power flow which may occur in a direction towards the commercial power source 12 such as by low failure of the ferroresonant voltage regulator 20, is also blocked and sensed by the reverse flow blocking and sensing circuits 16, again resulting in the initiation of an opening operation of switch 22 and thereby isolation of the commercial power source 12. Similarly, failure of any other element in series with the commercial power source 12 which would result in reverse power flow is noted because of such reverse power flow and the situation is immediately rectified.

Because of the existence of the energy storage element — the tuning capacitor — and a phase angle element — a reactor — in the ferroresonant voltage regulating circuit 20 as well as in the output of the inverter 30, failure of the commercial power source 12 or the inverter 30 does not result in an immediate cessation of energy supplied to the load terminal 24 from the failing line, but such energy supply may continue for a few moments — upto several cycles at ordinary commercial frequencies — so that there is no undue power loss or interruption of vital power supply to the load.

The nature of the switch 22 may be such that it can be a high speed electromechanical switch or a solid state switch, provided that it will, when open, provide complete power isolation. Similarly, shunt-trip circuit breakers or high speed mechanical disconnects may be used, but such switches usually require manual re-setting. Also, if the load connected to the load terminal 24 is reasonably steady an eddy-current switch may be used. In any event, the switch operates under control of other circuits, which may be sensing reverse power flow or line quality; and acts to preclude reverse power flow when sensed.

Commutating switches may also be placed in the output of the ferroresonant voltage regulator 20, thereby providing for reverse flow blocking.

Figure 2:
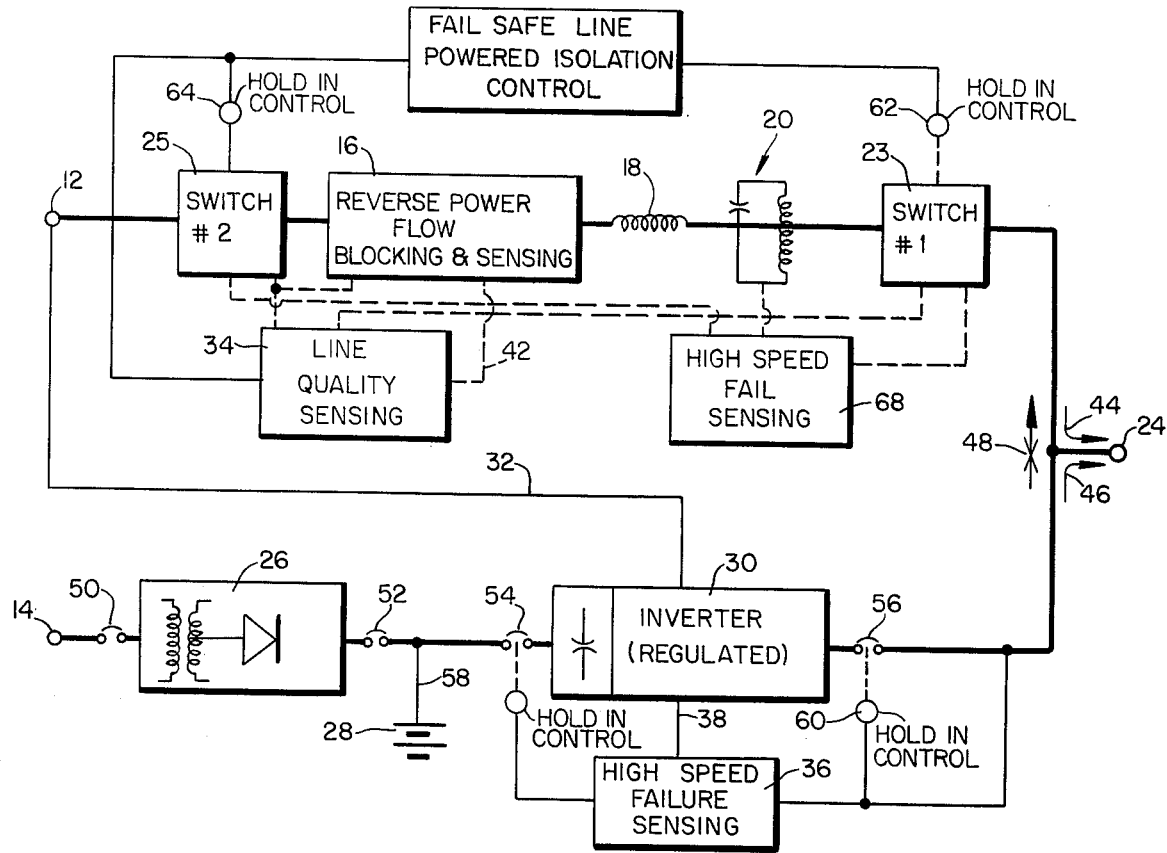
FIG. 2 is a more complete circuit of the sort shown in FIG. 1 but including additional sensing and isolating means and elements.

Turning now to the circuit of FIG. 2, it will be seen that the circuit is basically the same as that of FIG. 1, and therefore identical reference numerals have been used in all places where such similarities exist. Indeed, all of the integers of FIG. 1 are to be found in FIG. 2; except that switch 22 of FIG. 1 is indicated with the reference numeral 23 in FIG. 2 for reasons discussed hereafter.

The battery float charging circuit 26 is shown, in FIG. 2, to have isolating switches 50 and 52 on either side thereof. Likewise, the inverter 30 is shown to have isolating switches 54 and 56 on either side thereof, each of which is under the influence of a hold in control 58 or 60 respectively, which in turn is controlled by the high speed inverter failure sensing and isolation control circuits 36.

In series with the commercial power source 12, there is shown a switch 25 as well as the reverse power flow blocking and sensing circuits 16, the linear reactor 18, the ferroresonant voltage regulating circuit 20 and the switch 23. Indeed, either of switches 23 or 25 may be omitted, so that the switches 23 and 25 as shown in FIG. 2 might be considered as alternate switch positions for the same switch. In any event, the switches 23 and 25 may be any of the sort discussed above with respect to switch 22 as shown in FIG. 1. Each of switches 23 and 25 may be under the control of hold in controls 62 and 64 respectively, which in turn are under the control of a fail safe line powered isolation control circuit 66. Likewise, the switches 23 and 25 may be under the control of control signals which may emanate from the reverse power flow blocking and sensing circuits 16, the line quality sensing circuits 34, or high speed fail sensing circuits 68 which are connected to the ferroresonant voltage regulating circuit 20 and any other such element in series between the commercial power source 12 and the load terminal 24 which may be subject to failure.

Thus, the fail safe line powered isolation control 66 provides means whereby if the line begins to fail, the hold in controls 62 and/or 64 fail, and the switches 23 and/or 25 open. Likewise, if the ferroresonant voltage regulating circuit 20 fails, control signals emanate from the high speed fail sensing circuit 68 to open switch 23 and/or switch 25. In the same manner, and as discussed above, failure of such line quality parameters as voltage, current and frequency are sensed by the line quality sensing circuits 34, which again would result in opening of switch 23 and/or switch 25.

The reverse power flow blocking and sensing circuits 16 of either FIGS. 1 or 2 may be silicon controlled rectifiers or triacs which provide instantaneous reverse power flow blocking. Sensing of the reverse power flow and signal initiation may take a finite period of time — a portion or fraction of a cycle — but in the meantime, the reverse power flow may be blocked.

There has been shown a parallel redundant and load sharing regulated AC system, where uninterrupted power supply is assured to a critical load, by parallel and load sharing operation of a commercial power source having a regulated output and an inverter having its output synchronized to the commercial power source. Under normal operation, each of the regulated and conditioned commercial power source and the inverter share approximately equal portions of the load; but each power source is capable of supplying the entire load requirement and of doing so without interruption of the power supply to the load. Energy storage elements are provided in the downstream sides — the side closest to the load — of both of the conditioning and regulating circuits for the commercial power source and the inverter.

In such a manner, it is known that load may be shared on a 50/50 basis within approximately plus or minus 5%, irrespective of voltage fluctuations on the commercial AC source of plus or minus 15% or +10/−20% DC input voltage variations to the inverter.

The present invention does not provide static switches, reverse power flow sensors, power isolation switches or line quality parameter sensing means per se, because all of those elements are well known in the art; rather, the present invention provides a parallel redundant and load sharing AC system whereby reverse power flow towards the ordinary commerical AC power source is precluded at all times. Further, the present invention provides for the use of an ordinary commercial power source as one side of the parallel redundant system, and for the use of an entirely unrelated commercial power source as the source of AC power and energy from which the DC input to the inverter may be derived.

In the event that the commercial power source 12 and the commercial power source 14 are not identical, it may still be possible to provide a highly conditioned and regulated line as indicated in FIG. 1 with respect to the power line from commercial source 12, on both sides of the system. In that case, two line-regulated AC lines from independent commercial AC sources are operated in parallel. Of course, appropriate logic circuits would be provided so as to assure synchronism and the necessary supervisory and sensing functions, as discussed above.

Other amendments, alterations and substitutions in the circuits discussed above may be provided, without departing from the spirit and scope of the appended claims.

The embodiments of the invention in which an exclusive property or privilege is claimed are defined as follows:

1. In an electrical power system having two power sources, where at least the first power source is an ordinarily available alternating current having a voltage regulator in series therewith, and the second power source is synchronized to said first power source; and where the load is an alternating current load which is connected to both power sources so that during normal operation the load demand is shared by said power sources, the improvement comprising:

failure sensing and voltage and power isolation control means associated with said second power source, and adapted to sense failure of said second power source and to isolate it, voltage and power-wise, from said load in the event of failure thereof;

reverse power flow sensing means associated with said voltage regulator and said first power source for sensing reverse power flow towards said first power source; and reverse power flow blocking means actuable by said reverse power flow sensing means for blocking reverse power flow in a direction from said load towards said first power source upon sensing reverse power flow by said reverse power flow sensing means so as to isolate said first power source, voltage and power-wise, from said load when said reverse power flow is sensed.

2. The system of claim 1 where said second power source is an inverter having its output synchronized to said first power source.

3. The system of claim 1 where said means associated with said voltage regulator for sensing reverse power flow is connected to each of the elements which are in series connection with said voltage regulator and which are subject to failure, so as to sense failure thereof and to initiate operation of said reverse power flow blocking means so as to cause said voltage and power-wise isolation of said first power source, upon sensing failure of any of such series-connected elements.

4. The system of claim 1 where said means associated with said voltage regulator for sensing and for blocking reverse power flow is also arranged to sense line quality parameters of said first power source, including the paramaters of line voltage, supplied current, and power source frequency, so that said voltage and power-wise isolation of said first power source may be initiated if any sensed parameter is outside said predetermined limits.

5. The system of claim 1 where said voltage and power-wise isolation of said first power source from said load is effected by opening switch means inserted in series with said first power source on the load side of said voltage regulator.

6. The system of claim 1 where said voltage and power-wise isolation of said first power source from said load is effected by opening switch means inserted in series with said first power source on the side of said voltage regulator closest to said first power source.

7. The system of claim 1, including normally closed solid state switch means in series with said voltage regulator and controllable to open upon receiving an isolation initiation signal from said reverse power flow sensing means associated with said voltage regulator; and line powered voltage and power isolation switches on either side of the series combination of said reverse power flow sensing means and said voltage regulator.

8. The system of claim 1 where said voltage regulator is a ferroresonant voltage regulator circuit.

9. The system of claim 7 where said solid state switch is a commutating-type switch.

10. The system of claim 1 where said reverse power flow sensing means includes means for sensing voltage of said first power source and for initiating voltage and power isolation of said first power source if the sensed voltage thereof is outside of predetermined limits.

11. The system of claim 1 where the portions of said load shared by said first and second power sources are substantially equal.

* * * * *